(12) United States Patent
Gupta

(10) Patent No.: US 9,860,224 B2
(45) Date of Patent: Jan. 2, 2018

(54) SYSTEMS AND METHODS FOR SECURED ENTRY OF USER AUTHENTICATION DATA

(75) Inventor: Arupratan Gupta, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/977,579

(22) PCT Filed: Dec. 15, 2011

(86) PCT No.: PCT/US2011/065018
§ 371 (c)(1),
(2), (4) Date: Dec. 13, 2013

(87) PCT Pub. No.: WO2013/089717
PCT Pub. Date: Jun. 20, 2013

(65) Prior Publication Data
US 2014/0096201 A1    Apr. 3, 2014

(51) Int. Cl.
*G06F 21/31* (2013.01)
*H04L 29/06* (2006.01)
(Continued)

(52) U.S. Cl.
CPC ............ *H04L 63/08* (2013.01); *G06F 3/0233* (2013.01); *G06F 3/0238* (2013.01);
(Continued)

(58) Field of Classification Search
CPC ...... G06F 21/31; G06F 21/36; G06F 3/04886; G06F 3/0233; H04W 12/06; H04W 4/008
(Continued)

(56) References Cited

U.S. PATENT DOCUMENTS

2007/0096946 A1* 5/2007 Kim et al. ...................... 341/22
2008/0052233 A1* 2/2008 Fisher ................. G06Q 20/102
705/40
(Continued)

FOREIGN PATENT DOCUMENTS

CN    201069559 Y    6/2008
CN    101510331 A    8/2009
(Continued)

OTHER PUBLICATIONS

Definition of term "blink" form Dictionary.com, 2017.*
(Continued)

*Primary Examiner* — Thaddeus Plecha
(74) *Attorney, Agent, or Firm* — Schiff Hardin LLP

(57) ABSTRACT

Techniques for improving security of transactions requesting user authentication data entry via mobile devices are described herein. The mobile device is configured to wirelessly communicate using a near field communications (NFC) standard used to communicate over very short distances. The mobile device includes a graphical user interface (GUI) configured to display a virtual keypad arranged in a randomly generated pattern, the pattern being configured to be changed in a random manner at each instance of displaying the virtual keypad. Security of transaction is improved by randomly changing positions of virtual keys of the virtual keypad configured to receive the user authentication data.

18 Claims, 6 Drawing Sheets

(51) Int. Cl.
*H04W 12/06* (2009.01)
*G06F 3/023* (2006.01)
*G06F 3/0488* (2013.01)
*G06F 21/60* (2013.01)
*G06F 21/83* (2013.01)
*G06Q 20/32* (2012.01)
*G06Q 20/40* (2012.01)
*G07F 7/10* (2006.01)
*H04W 4/00* (2009.01)

(52) U.S. Cl.
CPC .......... *G06F 3/04886* (2013.01); *G06F 21/31* (2013.01); *G06F 21/606* (2013.01); *G06F 21/83* (2013.01); *G06Q 20/3278* (2013.01); *G06Q 20/4012* (2013.01); *G07F 7/1041* (2013.01); *H04W 12/06* (2013.01); *H04W 4/008* (2013.01)

(58) Field of Classification Search
USPC .............................................. 726/4
See application file for complete search history.

(56) References Cited

U.S. PATENT DOCUMENTS

| | | | |
|---|---|---|---|
| 2009/0106825 | A1 | 4/2009 | Cerruti et al. |
| 2010/0109920 | A1 | 5/2010 | Spradling |
| 2010/0275266 | A1* | 10/2010 | Jakobson et al. ............... 726/26 |
| 2011/0288965 | A1* | 11/2011 | Lazarro ............... G06Q 30/0641 705/27.1 |
| 2012/0144461 | A1* | 6/2012 | Rathbun ............... H04L 9/3213 726/5 |
| 2012/0268393 | A1* | 10/2012 | Lee ............................... 345/173 |
| 2013/0020389 | A1* | 1/2013 | Barnett ........................ 235/380 |

FOREIGN PATENT DOCUMENTS

| | | |
|---|---|---|
| CN | 101794365 A | 8/2010 |
| JP | 2008-033747 A | 2/2008 |
| KR | 10-2007-0002124 A | 1/2007 |
| WO | 2013/089717 A1 | 6/2013 |

OTHER PUBLICATIONS

Definition of term "blink" form Merriam-Webster.com, 2017.*
Kumar et al., "Reducing Shoulder-surfing by Using Gaze-based Password Entry", 2007, pp. 13-19.*
International Preliminary Report on Patentability and Written Opinion received for PCT Patent Application No. PCT/US2011/065018, dated Jun. 26, 2014, 5 pages.
International Search Report and Written Opinion Received for PCT Patent Application No. PCT/US2011/065018, dated Sep. 19, 2012, 8 pages.
Extended European Search Report received for European Patent Application No. 11877287.0, dated Aug. 5, 2015, 8 pages.
Office Action received for Chinese Patent Application No. 201180075484.0, dated Feb. 2, 2016, 15 pages of English Translation and 10 pages of Chinese Office Action.
Office Action Received for Chinese Patent Application No. 201180075484.0, dated Aug. 25, 2016, 19 pages (10 pages of English Translation and 9 pages of Chinese Office Action).
Office Action received for European Patent Application No. 11877287.0, dated Mar. 13, 2017, 7 Pages.
Office Action received for Chinese Patent Application No. 201180075484.0, dated Feb. 8, 2017, 9 pages of Chinese Office Action.

* cited by examiner

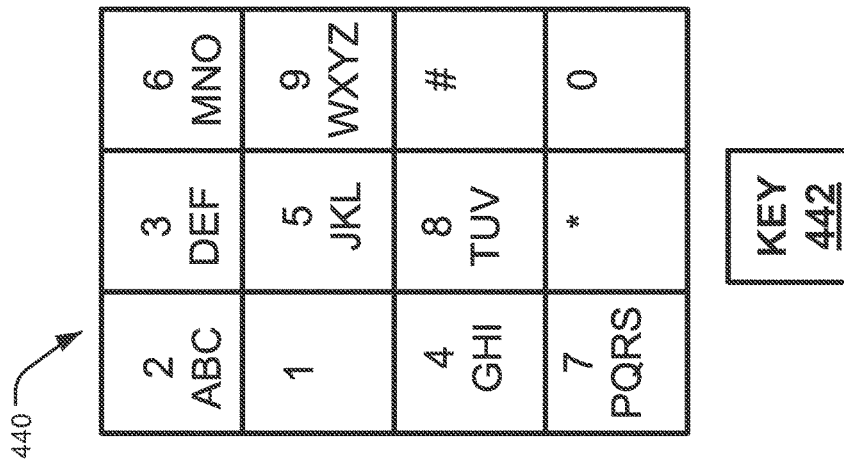

SYSTEMS AND METHODS FOR SECURED ENTRY OF USER AUTHENTICATION DATA

BACKGROUND

With proliferation of the use of contact based payment devices such as ATM cards and debit cards, and newer electronic contactless payment devices such as mobile devices equipped with mobile payment technology, there is a growing security concern about theft of personal and confidential data such as a personal identification number (PIN).

Shoulder surfing performed to observe finger movements of unsuspecting consumers has become a common occurrence at public places of processing business transactions, e.g., at an automated teller machine (ATM), a vending machine, or a point-of-sale (POS) terminal. Professional criminals, thieves, and hackers may easily guess a typical 4-digit PIN number used for a transaction by simply observing finger positions and movements made by a user to enter PIN data. In situations where shoulder surfing may not be practical, surveillance may be performed remotely. These professionals may set up electronic surveillance equipment such as cameras with powerful zoom lenses that may be located far away from the ATM or POS terminal to record finger positions and capture PIN data without the knowledge of the user.

BRIEF DESCRIPTION OF THE DRAWINGS

The Detailed Description references the accompanying figures. In the figures, the left-most digit(s) of a reference number identifies the figure in which the reference number first appears. The same numbers are used throughout the drawings to reference like features and components.

FIGS. 4A, 4B, 4C, and 4D are a series of displays that illustrate additional details of a GUI to randomize a layout pattern for keys of a virtual keypad described with reference to FIGS. 1, 2 and 3.

DETAILED DESCRIPTION

Figure 1:
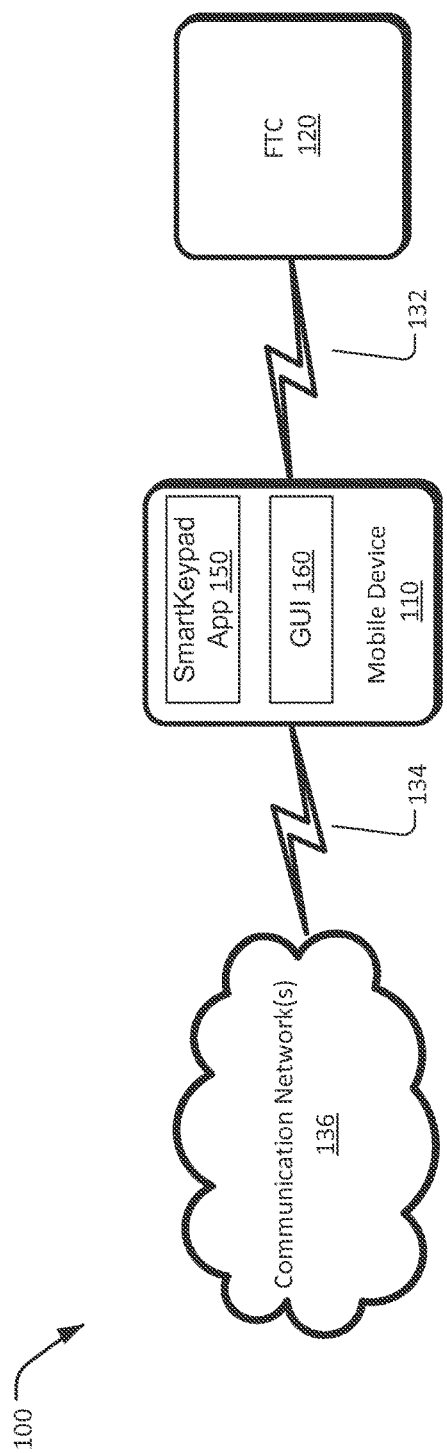
FIG. 1 illustrates a block diagram of a contactless mobile financial transaction system.

Applicants recognize that secured entry of user authentication data for processing a financial transaction is improved by incorporating a degree of randomness in a keypad display that is generated by an interactive display device. The keypad display emulates a physical keypad used for data entry of the user authentication data. In a fixed keypad design, a predictable co-relationship exists between a finger position and a fixed numeric value associated with a key. The keypad display that changes randomly eliminates the predictability of the co-relationship between the key position and key value.

The position of a key having a particular numeric value or a numeric value associated with a key placed in a particular position may be changed randomly. By incorporating randomness in the layout (may also be referred to as a pattern or an arrangement) of a keypad, a finger positioned, for example, in a left-hand-corner of the keypad may be associated with a numeric value of 1 in a first instance of display of the keypad. The finger positioned in the same left-hand-corner of the keypad may be associated, for example, with a randomly generated numeric value of 7 in a second instance of display of the keypad.

The security of the keypad for receiving user authentication data may be further enhanced by incorporating additional display controls, such as lower brightness, lower contrast, blinking, and others, of a keypad display to make it more challenging for thieves to read displayed numeric values from a distance. Tools and techniques described herein such as a randomly changing keypad layout offer solutions to improve security and retain the integrity of user authentication data.

In one application, a user may use a mobile device to process a contactless financial transaction with a smart keypad application solution (simply referred to as a SmartKeypad App). The SmartKeypad App is similar to an App program developed for an Apple or Android or Windows cellular phone that may be purchased from an Internet App Store web site or may be pre-loaded into the mobile device by the manufacturer.

The mobile device is configurable to perform wireless communications for: 1) contacting other mobile phone users or accessing Internet based services, and 2) authorizing a financial transaction between the mobile device and a POS terminal that is located within a close proximity such as cash withdrawal, or making a purchase with mobile payment. The SmartKeypad App uses the same intuitive, graphical user interface (GUI) display available on a mobile device to manage user interaction related tasks. The GUI improves the security of receiving user authentication data entered by a user by randomizing the layout or arrangement of a keypad displayed on a screen of the mobile device.

In one application, a computer system such as an ATM or a POS terminal, typically operable by a vendor, may be used to process a contact based financial transaction. Examples of a contact based financial transaction may include cash withdrawals with an ATM card or purchases made with a debit card that require swiping of the card and an entry of user authentication data to complete the transaction.

The computer system includes an interactive display device for generating displays on a display screen and an input device to receive user authentication data. A graphical user interface (GUI) display is configured to manage user interaction related tasks. The GUI improves the security of receiving user authentication data entered by a user by randomizing the layout or arrangement of a keypad displayed on the screen of the computer system.

This brief introduction, including section titles and corresponding summaries, is provided for the reader's convenience and is not intended to limit the scope of the claims, nor the proceeding sections.

The word "example" is used herein to mean serving as an example, instance, or illustration. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Contactless Mobile Financial Transaction System

FIG. 1 illustrates a block diagram of a contactless mobile financial transaction system 100 configured to process a financial transaction between two computing devices, e.g., a buyer's computer and a seller's computer, using contactless wireless communications there between. The contactless mobile financial transaction system 100 includes a mobile device 110 operated by a user to wirelessly communicate with a financial transaction computer (FTC) 120 such as an ATM or a POS terminal that may be operated by the vendor. The mobile device 110 is configured to provide secured entry of user authentication data that may be requested by the vendor's FTC 120 to authorize a financial transaction. It is understood that, unless otherwise stated, any communication network or device described herein may be implemented as a wired or wireless network or device.

The mobile device 110 is configurable to wirelessly communicate with: 1) FTC 120 using an interface 132 for short distance communications, and 2) web sites via the Internet and with other wireless cellar phone users using interface 134 for communications with one or more communication networks 136. The interface 132 includes two components, one component, which is included in the mobile device 110, and another component which is included in the FTC 120. The interface 132 may utilize a communications standard that may be designed for short distance communications such as an encrypted near field communications (NFC) standard or a Bluetooth standard. The interface 134 may be based on IEEE 802.XX family of standards for wireless communications. Additional details of the mobile device 110 are described with reference to FIG. 2.

A SmartKeypad App 150 is a software program that may be configured to randomize the position of keys displayed on a keypad (may also be referred to as a keyboard) for receiving a secured user input. The SmartKeypad App 150 may purchased from an App store hosted on the Internet (similar to App stores marketed by Apple, Google, and Microsoft), downloaded to the mobile device 110, and launched (or executed or activated) automatically upon startup of the mobile device 110. In some applications, the SmartKeypad App 150 may be provided as a standard, pre-loaded feature of the mobile device 110 by its manufacturer.

The SmartKeypad App 150 leverages the intuitive and easy-to-use graphical user interface (GUI) 160 of the mobile device 110 for user interaction. The SmartKeypad App 150 customizes the GUI 160 for improving security of data entry tasks or operations by randomizing the position of keys displayed on a keypad. Additional details of the GUI 160 to perform various keypad display related tasks or operations are described with reference to FIGS. 4A, 4B, 4C, and 4D.

Although not expressly shown in FIG. 1, the mobile device 110 and FTC 120 are both computing devices (or computer systems) that may include hardware, firmware, and/or software, which are configured to perform, at least in part, the techniques described herein.

In one operating scenario, the contactless mobile financial transaction system 100 shown in FIG. 1, may be easily adapted to process contact based financial transactions that use a computer readable card and an associated PIN entry for authorizing the transaction. Examples of contact based financial transactions may include cash withdrawals using ATM cards and purchases made with debit cards at a POS terminal. In this operating scenario, a user may enter PIN data on a display of the FTC 120 instead of entering the PIN data on a display of the mobile device 110.

Mobile Device with Dual Communications and Smart-Keypad App

Figure 2:
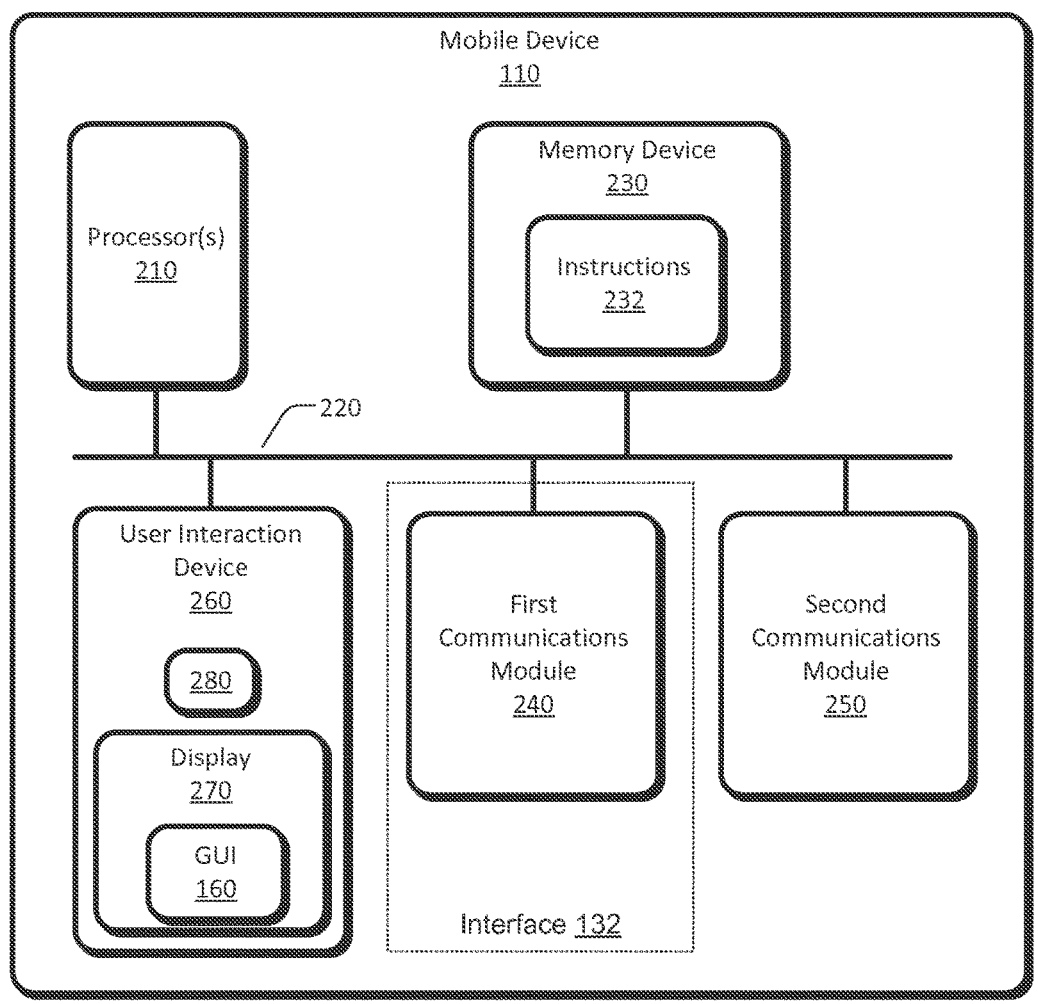
FIG. 2 is a block diagram illustrating additional details of a mobile device described with reference to FIG. 1. The illustrated portions implement tools and techniques to improve security of receiving user authentication data described herein.

FIG. 2 is a block diagram illustrating additional details of a mobile device described with reference to FIG. 1. The mobile device 110, which is a type of a computing device or a computer system, includes a processor 210 coupled to a bus 220, a memory device 230 coupled to the processor via the bus 220, a first communications module (COM) 240 coupled to the processor 210 via the bus 220, a second COM 250 coupled to the processor 210 via the bus 220, and a user interaction device 260 coupled to the processor 210 via the bus 220.

The user interaction device 260 may include a display 270 and an input device 280 such as a touch screen, a mouse, a trackball, or similar other cursor positioning peripheral configured to receive user input. The display 270 is configured to provide the GUI 160 for user interaction. Although not shown, the input device 280 may include a smaller sized QWERTY type fixed keypad for user input. In some applications, the display 270 and the input device 280 may be configured as separate components that may be directly coupled to the bus 220.

It should be understood that depending on the computing load more than one processor may be included in the mobile device 110. The memory device 230 is operable to store instructions or commands 232 that are executable by the processor 210 to perform one or more functions. It should also be understood that the term "computer system" is intended to encompass any device having a processor that is capable of executing program instructions from a memory medium. Various functions, processes, method 500, programs, and operations described herein may be implemented using the mobile device 110. For example, the processor 210 is operable to execute the instructions 232 associated with the SmartKeypad App 150 for randomizing the position of keys displayed on a keypad for receiving a secured user input via the input device 280.

The components of the mobile device 110 may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

The first COM 240, which forms one of the two components of the interface 132, is configured to wirelessly communicate over short distances using a first communication standard. The first communication standard may include a near field communications (NFC) standard configured to provide encrypted communications between any two NFC compliant devices located in very close proximity or a Bluetooth standard.

Near Field Communication (NFC) is a very short-range wireless standard that enables encrypted, secure wireless communication between NFC compliant devices over a short distance of approximately 20 centimeters. NFC is an ISO based standard. The ISO 14443 Type A and Type B standards +FeliCa is a four-part international standard for contact-less smart cards operating at 13.56 MHz in close proximity with a reader antenna. The ISO 18092 standard defines communication modes for NFC Interface and Protocol.

The NFC standard enables data transactions, data exchange, and wireless communications between two NFC compliant devices in close proximity to each other, e.g., located approximately within 20 centimeters. The NFC standard compliant devices may be configured to automatically discover one another. The mobile device 110 may be configured to query the FTC 120 and establish the wireless link. Set up time for automatically pairing two NFC compliant devices is typically less than 1 millisecond. Compared to the NFC standard, the Bluetooth standard typically supports communication over longer distances (e.g., up to 30 meters) and requires a longer set up time (e.g., about 5-6 seconds).

The second COM 250 is configurable to wirelessly communicate with the communication network(s) 136 using a second communication standard. The second communication standard may be based on IEEE 802.11 family of standards for wireless local area network (WLAN). The mobile device 110 may also be configured to support IEEE 802.16 family of standards for wireless broadband devices such as 3G and 4G cell phones with WiMAX capability.

The mobile device 110 is configured to provide secured entry of user authentication data to authorize a financial transaction. The user authentication data may be requested by the FTC 120. The SmartKeypad App 150 may be activated in response to receiving a request from the FTC 120 via the interface 132.

The SmartKeypad App 150 incorporates a degree of randomness in a virtual keypad display generated by the GUI 160. Randomness in displaying positions of keys on a keypad or randomness in associating functionality of a key in a particular position on a virtual keypad eliminates a predictable co-relationship that exists in a fixed keypad design, e.g., between a keypad position (and hence a finger position) and a fixed functional value associated with a key in that position.

The keys of the virtual keypad display may be arranged in a pattern and displayed on the display 270. The pattern is configurable to be randomly changed at each instance of displaying the virtual keyboard. Additional details of the pattern of keys displayed on a virtual keypad are described with reference to FIGS. 4A, 4B, 4C, and 4D.

As described herein, a virtual keypad is a display emulating a physical keypad (not shown). Like the physical keypad, the virtual keypad is configurable to receive user input via the input device 280. Unlike the physical keypad, the pattern (which may also be referred to as an arrangement or a layout) of the keys of the virtual keypad may be randomly changed per application needs. In addition, unlike the physical keypad, a function associated with a particular key or with a key position may also be randomly changed in the virtual keypad. Additional details of the GUI 160 that randomizes the position of keys displayed on a virtual keypad are described with reference to FIGS. 4A, 4B, 4C, and 4D.

Although the tools and techniques for randomizing patterns of keys for improved security are described with reference to a virtual keypad, the same tools and techniques may also be applied to fixed keys on a keypad if the visible identification on the fixed key may be changed by electronic techniques, e.g., by selecting fixed keys that are backlight by a LED or LCD device that is configurable to display changing values.

Example SmartKeypad Appliance with Wireless Communications

Figure 3:
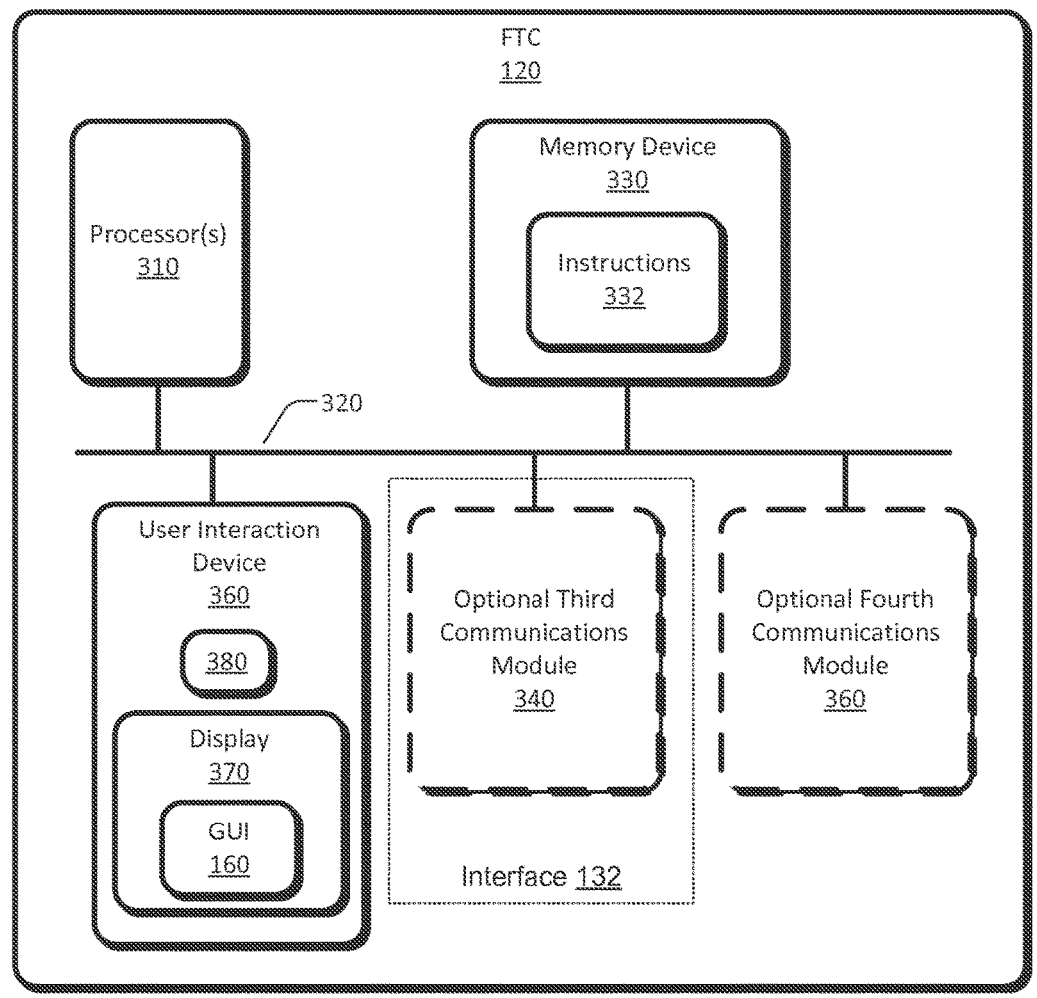
FIG. 3 is a Nock diagram illustrating additional details of a financial transaction computer (FTC) described with reference to FIG. 1. The illustrated portions implement tools and techniques to improve security of receiving user authentication data described herein.

FIG. 3 is a block diagram illustrating additional details of a financial transaction computer (FTC) 120 described with reference to FIG. 1. The FTC 120 and the mobile device 110 are both computing devices that may be configured to have substantially the same computer system components (e.g., hardware, firmware, software, or any combination thereof) except for types of peripheral devices and loading/performance specifications for the components.

The FTC 120 includes a processor 310 coupled to a bus 320, a memory device 330 coupled to the processor via the bus 320, an optional third communications module (COM) 340 coupled to the processor 310 via the bus 320, an optional fourth COM 350 coupled to the processor 310 via the bus 320, and a user interaction device 360 coupled to the processor 310 via the bus 320.

The user interaction device 360 may include a display 370 and an input device 380 such as a touch screen, a mouse, a trackball, or similar other cursor positioning peripheral configured to receive user input. The display 370 is configured to provide the GUI 160 for user interaction. Although not shown, the input device 380 may include a card reader to read an ATM card or debit card information, and a QWERTY type fixed keypad for user input. In some applications, the display 370 and the input device 380 may he configured as separate components that may he directly coupled to the bus 320.

The FTC 120 and the mobile device 110 may also be configured to provide substantially similar functionality such as launching the SmartKeypad App 150 to randomize a layout pattern for keys of a virtual keypad displayed on the display 370.

The optional third COM 340, may be configured to wirelessly communicate over very short distances, e.g., within a close proximity of about 20 centimeters, using the first communication standard described with reference to FIG. 2. As previously described, the first communication standard may include a near field communications (NFC) standard configured to provide encrypted communications between any two NFC compliant devices. The first communication standard may also include the Bluetooth standard. The optional fourth COM 350 may be used to communicate with other computing devices via the communication network(s) 136.

The memory device 330 is operable to store instructions 332 that are executable by the processor 310 to perform one or more functions. The processor 310 of the FTC 120 is operable to execute instructions or commands 332 received from the user or ATM/POS terminal operator and perform actions to process financial transactions including SmartKeypad App 150 to securely obtain user authentication data.

The components of the FTC 120 may be modules of computer-executable instructions, which are instructions executable on a computer, computing device, or the processors of such devices. While shown here as modules, the components may be embodied as hardware, firmware, software, or any combination thereof. The techniques described herein may be performed, as a whole or in part, by hardware, software, firmware, or some combination thereof.

SmartKeypad App Generating Random Key Patterns for a Virtual Keypad

FIGS. 4A, 4B, 4C, and 4D are a series of displays that illustrate additional details of the GUI 160 of the mobile device 110 to randomize a layout pattern for keys of a virtual keypad. Although the series of displays are described with reference to the mobile device 110, it is understood that the FTC 120 may also be configured to provide substantially the same series of displays. The SmartKeypad App 150, which may be stored in the memory device 230 of the mobile device 110, may be launched or activated in response to receiving a request for providing user authentication data. The SmartKeypad App 150 may launch the GUI 160 for displaying the virtual keypad on the display 270.

Figure 4B:
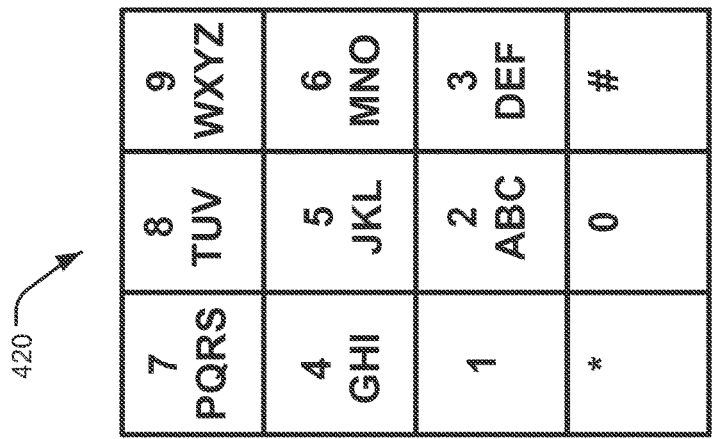
Figure 4A:
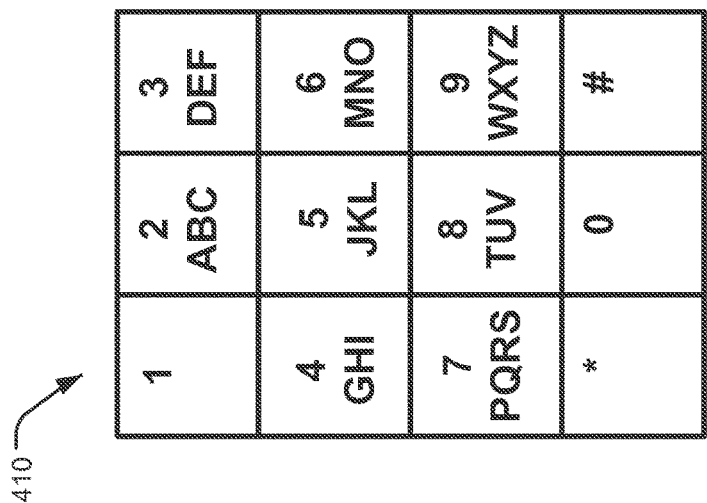

Referring to FIG. 4A, a virtual keypad display 410 is shown to include a first pattern or arrangement of the keys. The first pattern shown includes the virtual keypad display 410 emulating a physical keypad having at least 12 keys, e.g., a 12-digit numeric arranged in a 4×3 matrix. It is understood that the virtual keypad display 410 may be configured to include M×N number of keys arranged in a M×N matrix, M and N being integers. The first pattern, which may be described as a standard pattern, is often used as a default pattern for arranging the numeric keys of the physical keypad included on many landline based telephones and some cellular phones.

Referring to FIG. 4B, a virtual keypad display 420 is shown to include a second pattern or arrangement of the keys. The second pattern shown in the virtual keypad display 420 is different from the first pattern shown in the virtual keypad display 410, although both patterns conform to a 4×3 matrix arrangement of the 12 keys. That is, a left-hand-corner key position of the keypad in the first pattern may be associated with a particular function, e.g., a numeric value of 1, in a first instance of display of the virtual keypad. The same left-hand-corner key position of the keypad in the second pattern may be associated with a randomly generated function, e.g., a numeric value of 7, in a second instance of display of the virtual keypad. Although the first and second patterns are shown to conform to the 4×3 matrix arrangement of the 12 keys, it is understood that the randomized pattern may be configured to display the 12 keys arranged in a 3×4 matrix.

The randomized pattern for the arrangement of the keys, e.g., the first pattern and the second pattern, may be configured to be randomly generated by the SmartKeypad App 150 at each instance of receiving a request from the FTC 120 for providing user authentication data to the FTC 120. The second pattern shown in the virtual keypad display 420 may be randomly generated from the first pattern shown in the virtual keypad display 410 by randomly swapping positions of any two sets of elements of the 4×3 matrix aligned in one direction, e.g., by simply swapping rows 1 and 3 of the 4×3 matrix.

Referring to FIG. 4C, a virtual keypad display 430 is shown to include a third pattern or arrangement of the keys. The third pattern shown in the virtual keypad display 430 may be randomly generated from the first pattern shown in the virtual keypad display 410 by swapping positions of any two sets of elements of the 4×3 matrix aligned in one direction, e.g., by simply swapping columns 1 and 3 of the 4×3 matrix. It is understood that numerous permutations and combinations for generating other randomized patterns for the arrangements of the keys are contemplated. A random number generator may be used to select a randomized pattern from a library of randomized patterns stored in the memory device 230.

Referring to FIG. 4D, a virtual keypad display 440 is shown to include a fourth pattern or arrangement of the keys. The fourth pattern shown in the virtual keypad display 440 may be randomly generated from the first pattern shown in the virtual keypad display 410 by clockwise or counter-clockwise rotation of the elements of the 4×3 matrix. The virtual keypad display 440 also includes a key 442 for changing the display controls. A user may select the key 442 for selecting additional display control options, such as lower brightness, lower contrast, blinking, and others. The added display controls improve the security of receiving user authentication data by making it more challenging for others to read keypad values displayed on the virtual keypad display 440 from a distance.

Additional tools and techniques to further improve security of receiving user authentication data may include use of N-digit PIN numbers (N being an integer), use of alphanumeric PIN numbers, use of biometric data, and similar others.

Example Process

Figure 5:
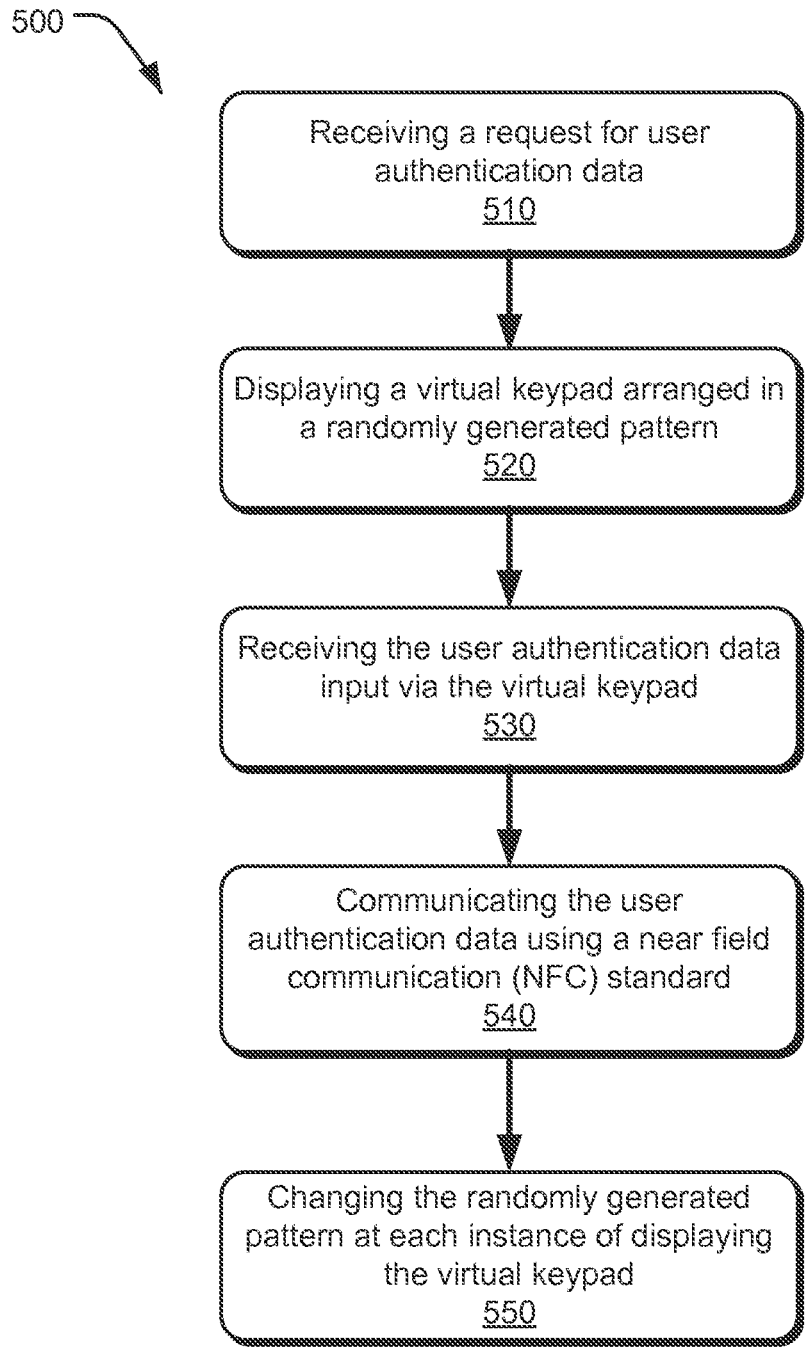
FIG. 5 a flow diagram illustrating a process to implement the techniques described herein for securely receiving user authentication data.

FIG. 5 is a flow diagram illustrating a process 500 that implements the techniques described herein for securely receiving user authentication data. The process is illustrated as a collection of blocks in a logical flow graph, which represents a sequence of operations that may be implemented in hardware, software, or a combination thereof. In the context of software, the blocks represent computer instructions that, when executed by one or more processors of such a computer, perform the recited operations. Note that the order in which the process is described is not intended to be construed as a limitation, and any number of the described process blocks may be combined in any order to implement the process, or an alternate process. Additionally, individual blocks may be deleted from the process without departing from the spirit and scope of the subject matter described herein.

At process 510, a request for user authentication is received, e.g., from FTC 120 for processing a financial transaction. At process 520, a virtual keypad that has keys arranged in a randomly generated pattern is displayed. At process 530, user authentication data that is entered by a user via the virtual keypad is received. At process 540, the user authentication data is communicated to the FTC 120 using NFC communications standard. At process 550, the randomly generated pattern is changed at each instance of displaying the virtual keypad.

The term "computer-readable media" includes computer-storage media. For example, computer-storage media may include, but are not limited to, magnetic storage devices (e.g., hard disk, floppy disk, and magnetic strips), optical disks (e.g., compact disk (CD) and digital. versatile disk (DVD)), smart cards, flash memory devices (e.g., thumb drive, stick, key drive, and SD cards), and volatile and non-volatile memory (e.g., random access memory (RAM), read-only memory (ROM)).

Unless the context indicates otherwise, the term "logic" used herein includes hardware, software, firmware, circuitry, logic circuitry, integrated circuitry, other electronic components and/or a combination thereof that is suitable to perform the functions described for that logic.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A mobile device comprising:
    a processor;
    a memory device coupled to the processor;
    a display device coupled to the processor, the display device comprising a graphical user interface (GUI) configured to display a virtual keypad arranged in a 4×3 pattern, the 4×3 pattern being configured to have a random function that is associated with a particular key or a key position, or a random arrangement of a layout of keys in the virtual keypad, wherein the virtual keypad is displayed as a 3×4 pattern in a subsequent display of the virtual keypad;

a communication module coupled to the processor and the display device, the communication module is configured to transmit a user-selected input on the 4×3 pattern to a financial transaction computer (FTC), wherein the communication module receives a user authentication data request from the FTC, the receiving of the user authentication data request facilitates changing of the 4×3 pattern into the 3×4 pattern, wherein the communications module communicates with the FTC only when the mobile device is in proximity to the FTC.

2. The mobile device of claim 1, wherein the communication module comprises a first communications module (COM) being configured to wirelessly communicate using a near field communications (NFC) standard configured to provide encrypted communications within 20 centimeters.

3. The mobile device of claim 1, wherein the virtual keypad emulates a numeric keypad having at least 12 keys in addition to a separate key.

4. The mobile device of claim 1, wherein the random arrangement comprises a rotation of 10 keys out of at least 12 keys.

5. The mobile device of claim 1, wherein the virtual keypad is configurable to be displayed at a reduced brightness level in response to receiving a user request.

6. The mobile device of claim 1 further comprising: a fixed keypad having keys with a visual identification, wherein a pattern of keys on the fixed keypad is changed in a random manner by electronically changing the visual identification.

7. The mobile device of claim 1 further comprising:
a fixed keypad having keys with a visual identification, wherein the visual identification is generated by keys that are an electronic 7-segment display device configurable to display a randomly generated value.

8. A mobile device configured to receive user authentication data, the mobile device comprising:
means for displaying a virtual keypad arranged in a 4×3 pattern, the 4×3 pattern being configured to have a random function that is associated with a particular key or a key position, or a random arrangement of a layout of keys in the virtual keypad;
means for transmitting a user-selected input on the 4×3 pattern to a financial transaction computer (FTC);
means for receiving a user authentication data request from the FTC; and
means for displaying the virtual keypad as a 3×4 pattern in a subsequent display of the virtual keypad, wherein the receiving of the user authentication data request facilitates changing of the 4×3 pattern into the 3×4 pattern, wherein the mobile device communicates with the FTC only when the mobile device is in proximity to the FTC.

9. The mobile device of claim 8 further comprising: means for changing a pattern of the virtual keypad at each instance of displaying the virtual keypad.

10. The mobile device of claim 8 further comprising:
means for communicating using a near field communications (NFC) standard configured to provide secure communications between any two NFC compliant devices that are located within 20 centimeters.

11. The mobile device of claim 8 further comprising: means for reducing a brightness level of a display displaying the virtual keypad.

12. The mobile device of claim 8 further comprising: means for changing a pattern of the virtual keypad at each instance of displaying the virtual keypad, wherein the means for changing includes configuring the virtual keypad to have at least 12 virtual keys arranged in a 4×3 or 3×4 matrix pattern and randomly swapping positions of any two sets of matrix elements aligned in one direction.

13. The mobile device of claim 8 further comprising: means for changing a pattern of the virtual keypad at each instance of displaying the virtual keypad, wherein the means for changing the pattern includes a rotational movement of virtual keys included in the virtual keypad.

14. At least one non-transitory computer-readable medium having stored thereon instructions for receiving user authentication data, the instructions being executable to cause a computer processor to:
display, on a mobile device, a virtual keypad arranged in a 4×3 pattern, the 4×3 pattern being configured to have a random function that is associated with a particular key or a key position, or a random arrangement of a layout of keys in the virtual keypad;
transmit, by the mobile device, a user-selected input on the 4×3 pattern to a financial transaction computer (FTC);
receive, by the mobile device, a user authentication data request from the FTC; and
display, by the mobile device, the virtual keypad as a 3×4 pattern in a subsequent display of the virtual keypad, wherein the receiving of the user authentication data request facilitates changing of the 4×3 pattern into the 3×4 pattern, wherein the mobile device communicates with the FTC only when the mobile device is in proximity to the FTC.

15. The at least one non-transitory computer-readable medium of claim 14, wherein the instructions being executable to further cause the computer processor to:
change a pattern of the virtual keypad at each instance of displaying the virtual keypad.

16. The at least one non-transitory computer-readable medium of claim 14, wherein the instructions being executable to further cause the computer processor to:
communicate using a near field communications (NFC) standard configured to provide secure communications between any two NFC compliant devices that are located within 20 centimeters.

17. The at least one non-transitory computer-readable medium of claim 14, wherein the instructions being executable to further cause the compute processor to:
dim a brightness level of a display displaying the virtual keypad.

18. The at least one non-transitory computer-readable medium of claim 14, wherein the virtual keypad includes at least 12 virtual keys arranged in a 4×3 or 3×4 matrix pattern and is changed by swapping positions of any two sets of matrix elements aligned in one direction.

* * * * *